United States Patent

Gustafson

[11] Patent Number: 6,014,945
[45] Date of Patent: Jan. 18, 2000

[54] CONNECTION DEVICE FOR A MILKING UNIT

[75] Inventor: Kenneth Gustafson, Södertälje, Sweden

[73] Assignee: Alfa Laval Agri AB, Tumba, Sweden

[21] Appl. No.: 08/737,860

[22] PCT Filed: May 23, 1995

[86] PCT No.: PCT/SE95/00577

§ 371 Date: Nov. 15, 1996

§ 102(e) Date: Nov. 15, 1996

[87] PCT Pub. No.: WO95/32614

PCT Pub. Date: Dec. 7, 1995

[30]   Foreign Application Priority Data

May 31, 1994  [SE]  Sweden .................................. 9401871

[51] Int. Cl.[7] ...................................................... A01J 7/00
[52] U.S. Cl. ...................................................... 119/14.01
[58] Field of Search .............................. 119/14.01, 14.02, 119/14.05, 14.08, 14.28, 14.41

[56]   References Cited

U.S. PATENT DOCUMENTS

| D. 380,525 | 7/1997 | Gustafsson et al. .................. D23/233 |
| 3,820,506 | 6/1974 | Conde .................................. 119/14.01 |
| 4,214,552 | 7/1980 | Olander .............................. 119/14.01 |
| 5,445,357 | 8/1995 | Torgerson et al. ................... 119/14.01 |

FOREIGN PATENT DOCUMENTS

| 2637117 | 10/1977 | Germany . |
| 170120 | 1/1960 | Sweden . |

*Primary Examiner*—Thomas Price
*Attorney, Agent, or Firm*—Hovey, Williams, Timmons & Collins

[57]   ABSTRACT

A connection device for connection of a milking unit (1) to a milk line (4) comprising a valve housing (9) with a sliding valve (31) and a connection member (8). The connection member (8) is arranged to be releasably connected to the valve housing (9). A guide (44) is provided to positively guide the connection member (8) relative to the valve housing (9) during connection of the connection member (8). A sliding valve (31) is adapted to cover the opening (30) in a closing position and to uncover the opening (30) in an opening position. According to the invention a catching member (43) is arranged during movement of the connection member (8) towards the valve housing (9) to guide the connection member (8) to a position where the connection member (8) engages the valve housing (9) by interaction with the guide (44). Alternatively, a coupling device (47) is provided to connect the connection member (8) to the sliding valve (31) and to release the connection member (8) from the sliding valve (31), respectively, in a predetermined position.

17 Claims, 9 Drawing Sheets

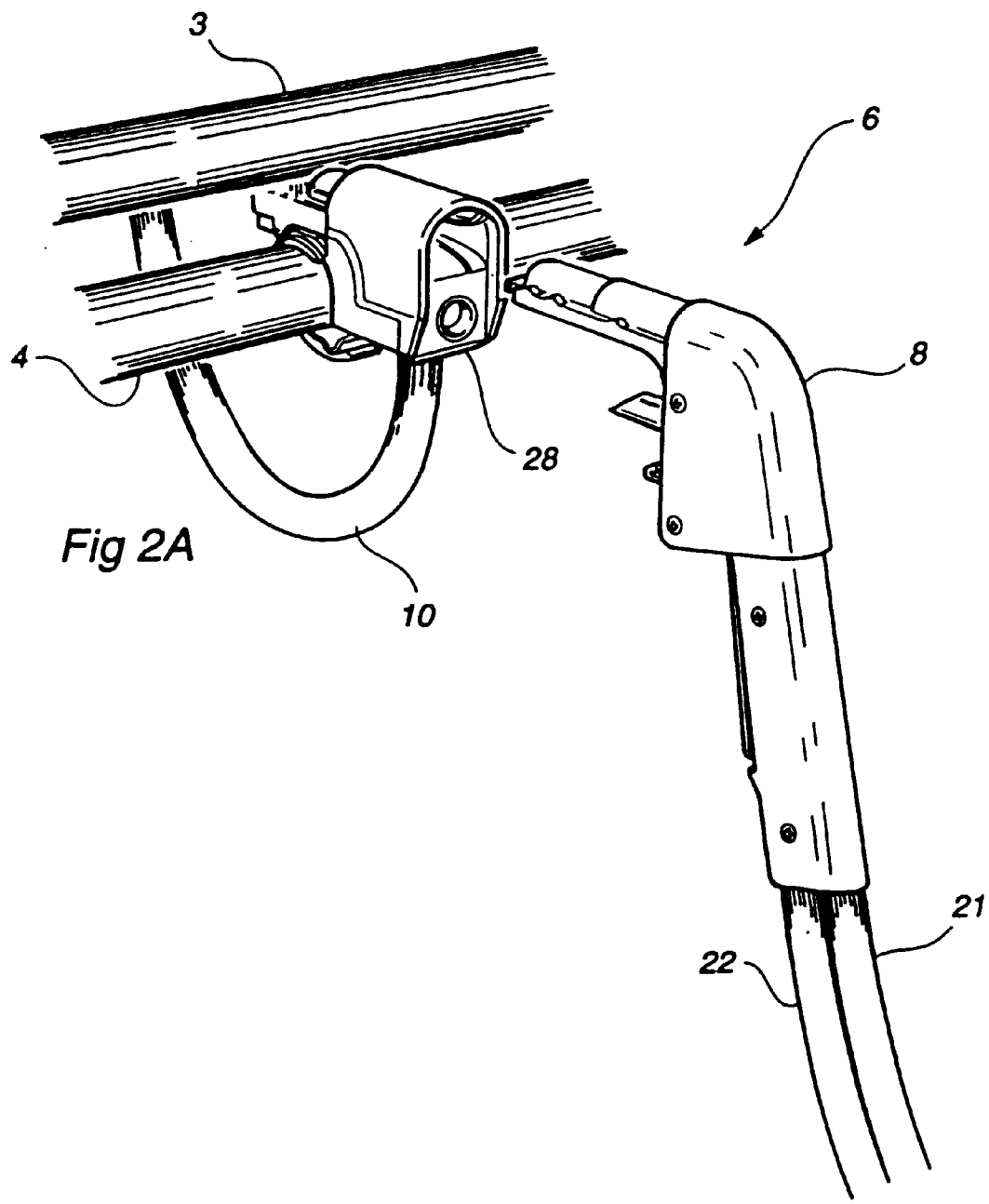

CONNECTION DEVICE FOR A MILKING UNIT

FIELD OF THE INVENTION

The present invention relates to a connection device for connection of a milking unit to a milk line in a pipeline milking plant.

BACKGROUND

A problem with such a connection device is that all surfaces that are wet by milk, must in order to fulfil set up hygienic requirements be able to be cleansed during washing of the pipeline milking plant, which is performed such that washing solution is rinsed through the whole plant.

One known connection device is described in SE-C-174 540 and comprises a valve housing mounted on a milk line and a connection member connected to a milking unit. During connection of the connection member to the valve housing a knob of a connection member must be accurately fitted into a recess of a substantially semi-spherical body, which must thereafter be turned by hand power to a position where an opening of the connection member is right before an opening of the valve housing, such that communication between the milk line and the milking unit is created.

The described connection device has a disadvantage therein that the connection member must be turned together with the said semi-spherical body, being an undesired complication of the connection operation.

In DE-A-2 637 117 is certainly described a connection device free of turning movement, but also this one suffers from a serious drawback, since two nipples of the connection member must be accurately fitted into two corresponding holes in the valve housing before connection can be performed. The milker must furthermore perform two movements in order to connect the connection member to the valve housing; first a movement towards the valve housing, thereafter a vertical movement.

Another known connection device is described in SE-C-170 120 and comprises a valve housing on a line and a connection member. When the connection member is to be connected to the valve housing, the connection member must first be fitted into a circular-cylindrical drilling in the valve housing. After that guiding means of the connection member have to be carefully fitted into corresponding guiding means of the valve housing.

In DE-A-4 003 367 there is a further connection device free of turning movement described. This one is equipped with a catching member, which however, as shown in the figures, is intended to be mounted vertically on a milk line, which member unnecessary lifts for the milker. Furthermore, the described connection member cannot be connected to the valve housing in one movement, since it first has to be brought in one direction up to the valve housing and thereafter in a completely different direction in the valve housing.

The firm R. J. Fullwood & Bland Ltd. manufactures and markets a connection device comprising a valve housing named "Dari-line Station" and a connection member having the designation "Dari-line Glide". The connection member can certainly be connected to the valve housing in one single movement, but the valve housing is shaped such that during connection of the connection member, as well as during removal of the same, a large amount of surrounding air is allowed to be sucked into the milk line, which is not desired.

When a milking unit is moved from one cow to another, a small amount of milk nearly always stays in the milk tube that connects the milking unit to the connection member. During connection of the connection member to the milk line, which is connected to a vacuum source, the small amount of milk is slung towards the valve housing. The valve housing marketed by Fullwood is designed such that the small amount of milk hits surfaces of the valve housing that cannot be cleansed automatically during washing of the milking plant but have to be cleansed manually after each milking for avoiding growth of bacteria thereon.

One object of the invention is to achieve a connection device of the kind in question, by means of which the connection device can be easily connected to the valve housing, preferably by movement of the connection member in substantially one single direction.

Another object of the invention is to achieve a cooperation between the connection member and a valve present in the valve housing, such that inlet of air into the milk line and milk leakage during connection and disconnection of the connection member can be avoided or at least be minimized.

A further object of the invention is to avoid t milk contaminates the connection device, such that only automatic washing of the pipeline milking equipment is necessary.

In accordance with the invention a connection device for connection of a milking unit to a milk line in a pipeline milking plant is suggested, the milk line having a wall that surrounds a channel and has a hole, and the milking unit having a cavity for extracted milk, comprising a valve housing having an opening and being adapted to be fastened to the milk line in such a way that the opening communicates with the channel of the milk line via the hole in the wall of the milk line;

a connection member having a through passage and being adapted to be connected to the milking unit in such a way that the passage communicates with said cavity of the milking unit, the connection member further being adapted to be releasably connected to the valve housing in such a way that the passage communicates with the opening of the valve housing;

guiding means adapted during a translational movement of the connection member to positively guide the connection member in relation to the valve housing in a predetermined movement path from a first position to a second position, in which latter position the passage of the connection member communicates with the channel of the milk line via the opening of the valve housing and the hole in the wall of the milk line; and a sliding valve which is adapted to cover said opening of the valve housing in a closing position, such that it communicates with the passage of the connection member, and a coupling device adapted, during a positively controlled translational movement of the connection member, when this is in an intermediate position between said first and second positions to connect the connection member to the sliding valve in such a way that the sliding valve is positively connected to the connection member, the coupling device further being adapted to release the connection member from the sliding valve in said intermediate position of the connection member, when this is moved in a direction from said second towards said first position.

Suitably the coupling device comprises at least one coupling member, which in said intermediate position of the connection member is freely movable between a connecting position and a disconnecting position when not actuated, but is adapted, in said connecting position, to be kept substantially immovable relative to the sliding valve and the connection member, when the connection member actuates the sliding valve during the movement of the sliding valve between its intermediate position and its said second position. Hereby is achieved a secure connection of the connection member to the sliding valve.

Preferably, the valve housing is shaped such that it keeps the clutch member in said connecting position when the connection member is between its intermediate position and said second position. Hereby the sliding valve is prevented from undesiredly coming loose from the connection member during its movement.

Advantageously, a catch member is provided to guide the connection member to said first position during movement of the connection member towards the valve housing, such that the connection member gets into engagement with the valve housing by means of said guiding means. Hereby is achieved a connection member, by means of which the connection member can be connected to the valve housing in one single movement.

SHORT DESCRIPTION OF THE FIGURES

The invention will now be described more closely with reference to the accompanying drawings, on which FIG. 1 shows a milking equipment with a connection device according to the invention, FIG. 2A illustrates the connection device as shown in FIG. 1, comprising a valve housing mounted on a milk line and a connection member, FIG. 2B is a lower right front perspective view of the connection device shown in FIG. 2A;

DETAILED DESCRIPTION

Figure 1:
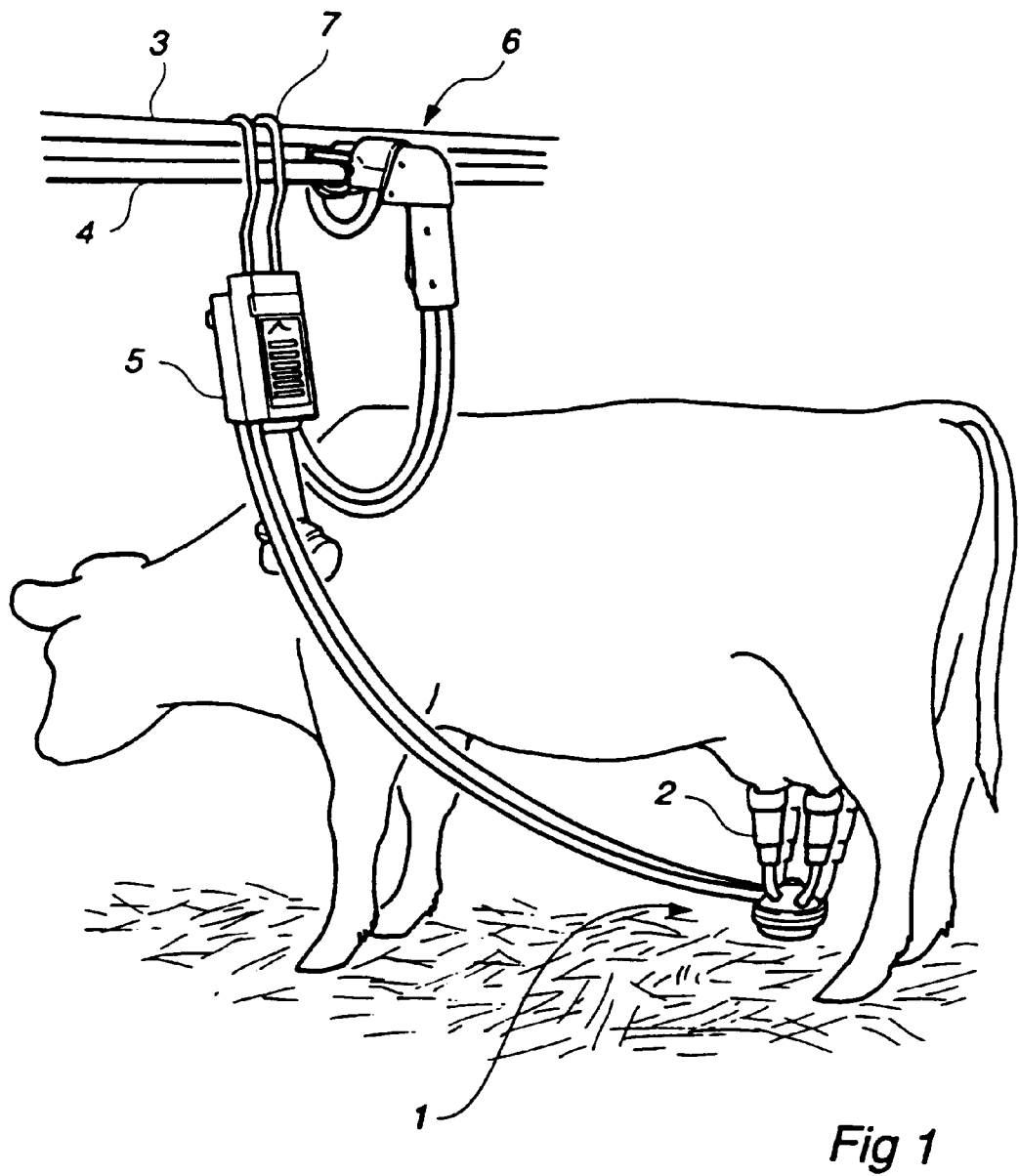

FIG. 1 shows a cow during milking, i.e. with a milking unit's 1 teatcups 2 attached to the teats of the cow. The milking unit is connected to a vacuum line 3 and a milk line 4 of a pipe line milking plant via a control unit 5 and a connection device 6 according to the invention, which is here shown in connected state. The control unit 5 has a hook 7, by means of which it is hung on the vacuum line 3.

FIG. 2A shows the connection device 6 according to the invention, comprising a connection member 8 ready to be connected to a valve housing 9, which is mounted on and connected to the milk line 4. The valve housing 9 is provided with a hose 10, which is connected to the vacuum line 3.

Figure 2B:
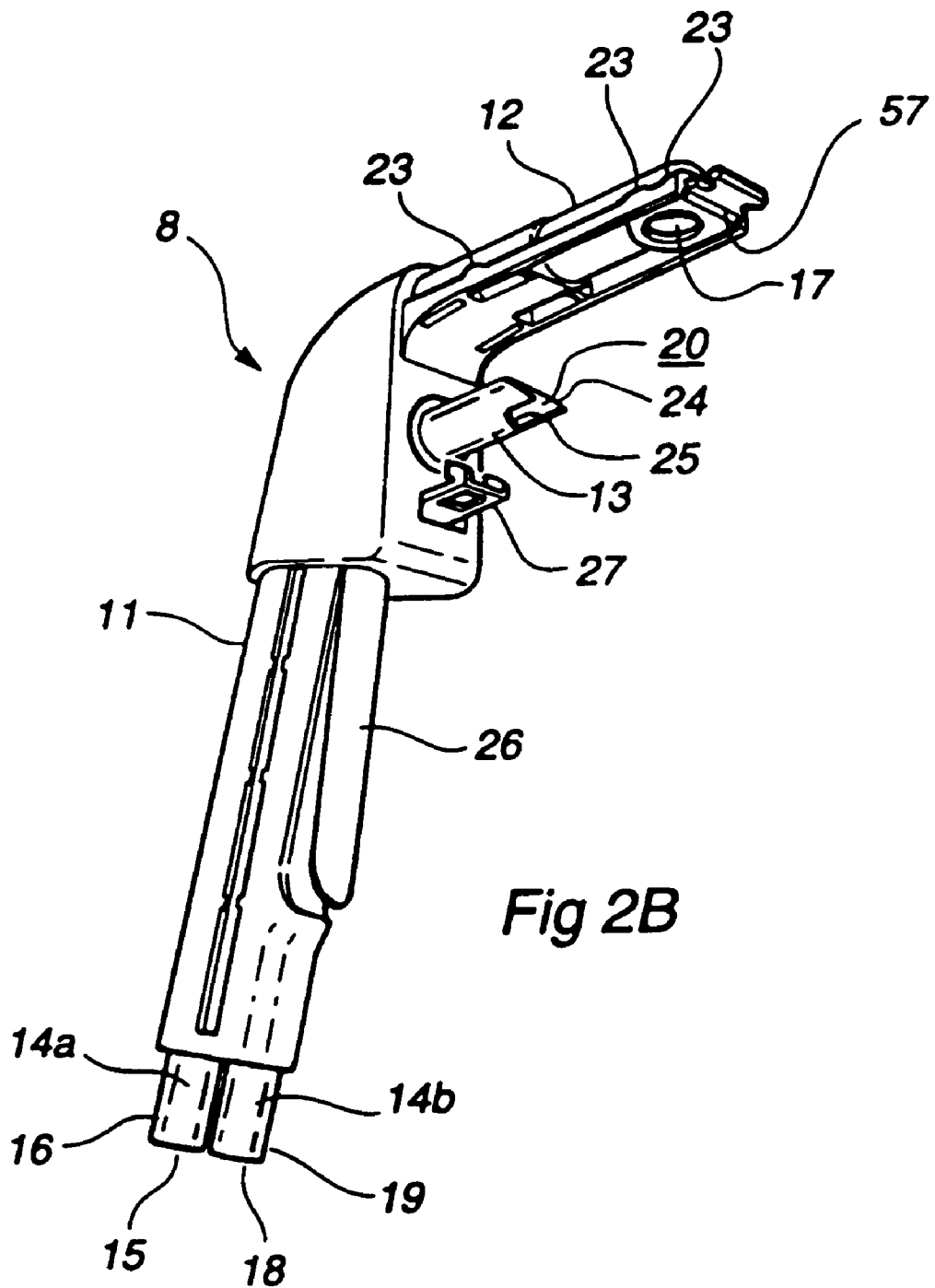

As shown in FIG. 2B the connection member 8 has a handle 11, which is provided with a first protruding part 12, and a second protruding part 13. A first through passage 14a extends through the handle 11 from an opening 15 in a first tube attachment 16 to an opening 17 in the first protruding part 12 (see FIG. 3A). A second through passage 14b extends through the handle 11 from an opening 18 in a second tube attachment 19 to an opening 20 in the second protruding part 13 (see FIG. 3A). Both the tube attachments 16,19 are, as shown in FIG. 2A, connected to tubes 21,22, leading to the milking unit 1 via the control unit 5 (see FIG. 1).

The first protruding part 12 is furthermore provided with six bulges 23, which are adapted to facilitate sealing in the valve housing 9, which will later be more closely described.

The second protruding part 13 is provided with a bevelled edge 24 and a recess 25, the respective function of which will be explained in connection with FIG. 3D.

The connection member 8 is furthermore provided with a locking device comprising a push handle 26 and a ratchet 27 (see FIG. 2B), which is provided to hook into an edge 28 of the valve housing 9 (see FIG. 2A).

Figure 3A:
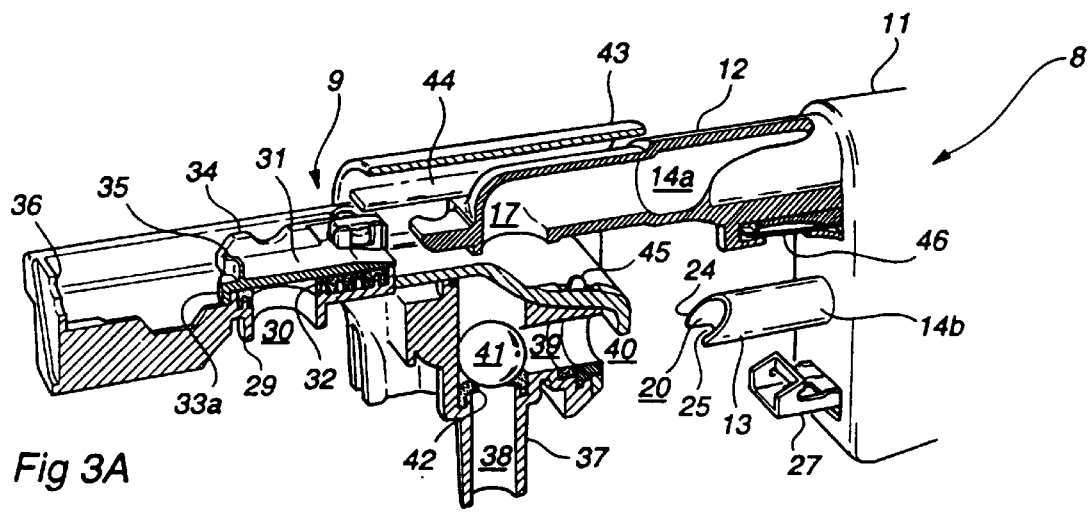
FIG. 3A is an upper left front fragmentary perspective view in partial cross-section of the connection member showing valve housing and a sliding valve arranged in the valve housing during the connection of the connecting member to the valve housing in a first step.

FIG. 3A is a sectionary view of the valve housing 9. For the mounting of the valve housing 9 onto the milk line 4 the valve housing 9 has a first connection piece 29 with a through opening 30, which connection piece 29 is adapted to be brought into a hole made in the wall of the milk line 4. The valve housing 9 can be fastened to the milk line 4 by means of a clutch (not shown) such that a sealed connection is achieved between the inner of the valve housing 9 and a channel inside the milk line 4.

The valve housing 9 is provided with a sliding valve 31, which in a position shown in FIG. 3A covers the opening 30 of the first connection piece 29. In order to guarantee sealing at the valve, the opening 30 is surrounded by a sealing member 32 (see also FIGS. 6A and 6B).

Figure 3B:
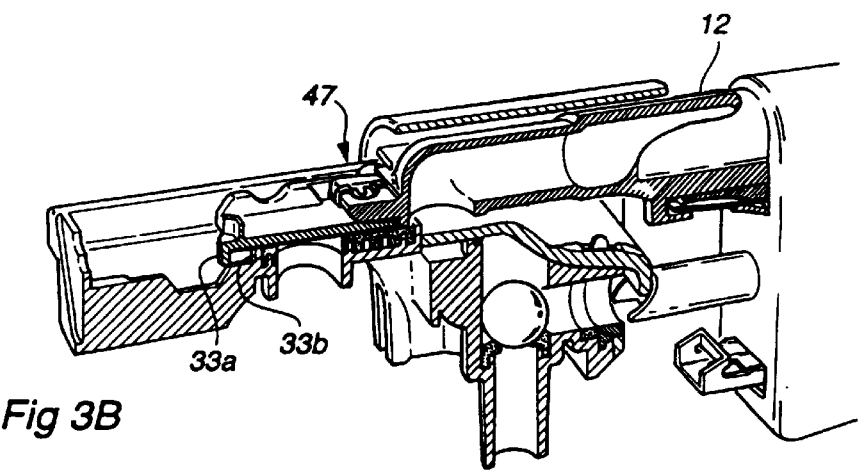
FIG. 3B is an upper left front fragmentary perspective view in partial cross-section similar to FIG. 3A showing the connection of the connecting member to the valve housing in a second step.

The sliding valve 31 has a plane lower surface and has at one end a stop member 33a, which is adapted to be able to abut a corresponding edge 33b of the valve housing 9 (see FIG. 3B).

Figure 5A:
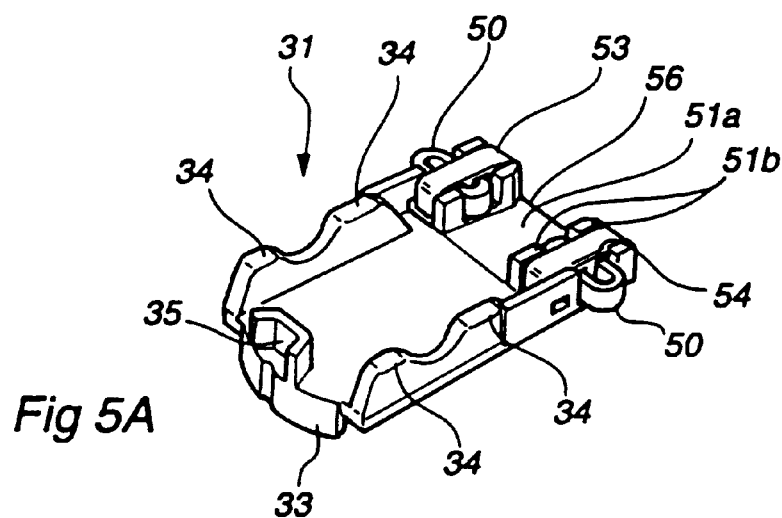
FIG. 5A is an upper right rear perspective view of the sliding valve of the present invention.

The sliding valve 31 is furthermore provided with four bulges 34 (see FIG. 5A), which are adapted to further facilitate sealing between the sliding valve and the sealing member 32 of the valve housing 9 by abutting and sliding against an upper wall (not shown) of the valve housing (9).

The sliding valve 31 is furthermore provided with a substantially U-shaped shoulder 35, intended to receive a long and narrow member for effecting the sliding valve 31 in case this one has not taken a desired position. The valve housing 9 is provided with a hole 36 for introduction of a long and narrow member and thereby enabling such an operation.

The valve housing 9 also has a second connection piece 37 with a through opening 38 intended to be introduced into the hose 10, which is connected to the vacuum line 3. A channel 39 connects the opening 38 of the second connection piece 37 to an opening 40 of the valve housing 9. A ball valve comprising a ball 41, which abuts a seating 42, is in a position shown in FIG. 3A adapted to keep the opening 38 of the second connection piece 37 closed.

The valve housing 9 is furthermore provided with a catching member 43, provided to catch the connection member 8 during a movement of the same towards the valve housing 9 and to guide the connect ion member 8 to a first position (see FIG. 3A) in which it gets into engagement with guiding means 44 arranged to further guide the connection member 8 towards the sliding valve 31 in a positively guided translational movement.

The valve housing 9 is also provided with connectors 45 for electricity, corresponding to connectors 46 in the handle 11 of the connection member 8. The connectors are disconnected in FIG. 3A.

FIG. 3B shows the connection member 8 in an intermediate position in the valve housing 9 where a coupling device 47 couples the first protruding part 12 of the connection member 8 with the sliding valve 31.

Figure 3C:
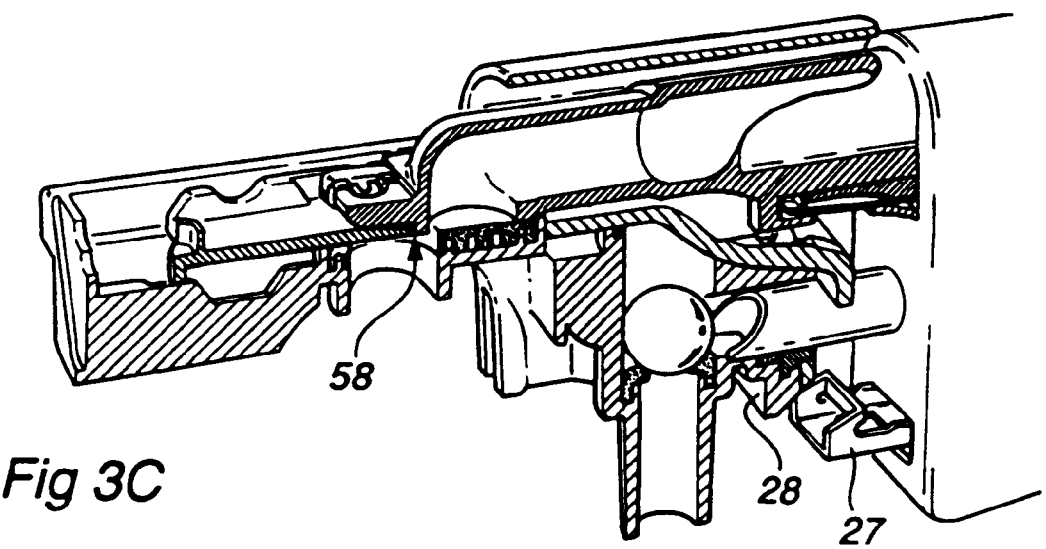
FIG. 3C is an upper left front fragmentary perspective view in partial cross-section similar to FIGS. 3A and 3B showing the connection of the connecting member to the valve housing in a third step.

FIG. 3C shows the connecting member 8 in a position in the valve housing 9 where the sliding valve 31 has been moved such that it no longer completely covers the opening 30 of the connection piece 29 of the valve housing 9, but a slight communication is present between the channel of the milk line 4 (not shown) and the first passage 14a of the connection member 8.

In the valve housing's channel 39, which leads to the second connect ion piece 37, the second protruding part 13 of the connection member 8 is introduced such that it is almost at the ball valve, which is however not yet sealing.

Figure 3D:
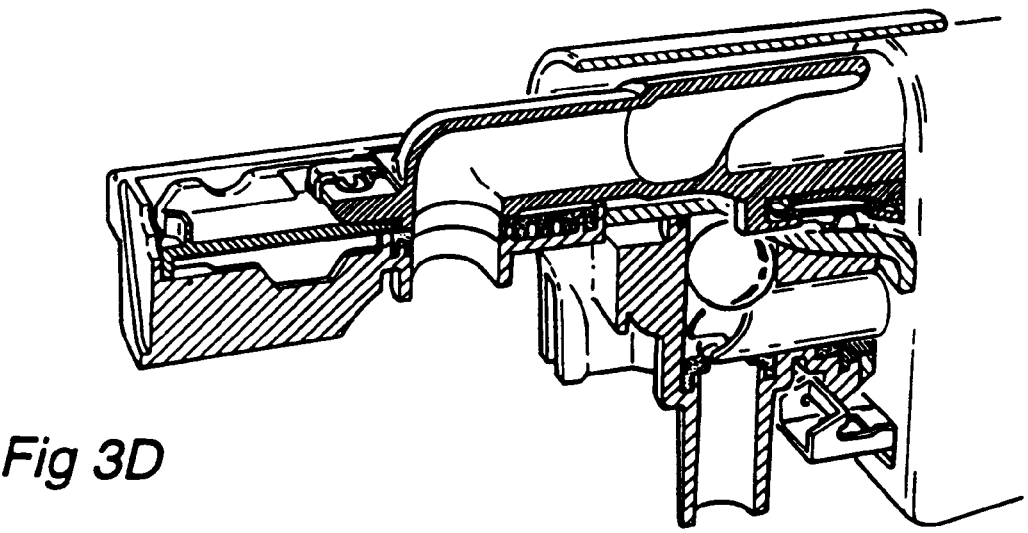
FIG. 3D is an upper left front fragmentary perspective view in partial cross-section similar to FIGS. 3A, 3B and 3C showing the connecting member connected to the valve housing in a fourth step.

FIG. 3D shows the connection member 8 in a second position in the valve housing 9, where the opening 17 of the connection member's 8 first protruding part 12 is right before the opening 30 of the connection piece 29 such that the first passage 14a of the connection member 8 is in communication with the channel of the milk line 4. The bulges 23 of the connection member 8 abut the not shown wall of the valve housing 9 such that the connection member 8 seals against the sealing member 32 of the valve housing 9.

Furthermore, the ball 41 has been lifted up off the bevelled edge 24 of the second protruding part 13 of the connection member 8, the recess 25 of which now enables communication between the vacuum line 3 (not shown) and the second passage 14b of the connection member 8.

In this position also the connectors 45,46 have been brought together, such that tension from a central source of tension starts a pulsator (not shown) of the control unit 5.

Simultaneously, the ratchet 27 has hooked into the front edge 28 of the valve housing 9.

Figure 4A:
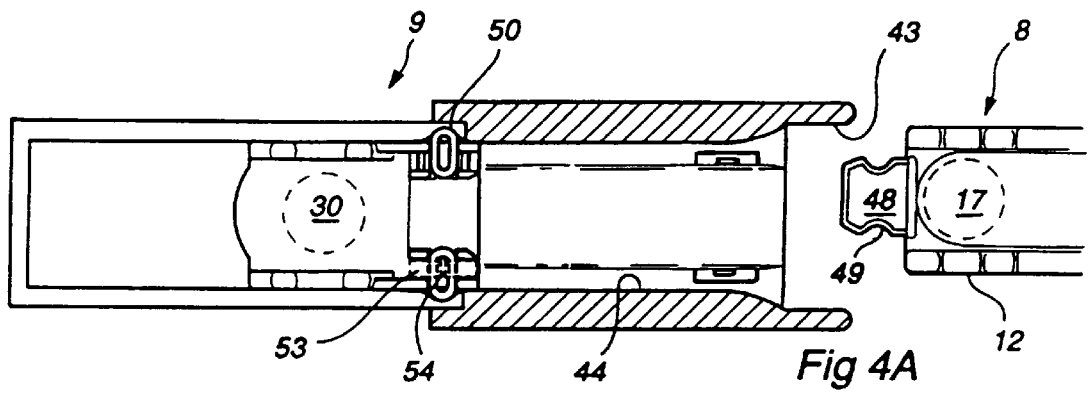
Fig. 4A is an enlarged, fragmentary top plan view showing the connection of the connection member to the valve housing and coupling to the sliding valve in a first step.

FIG. 4A shows the valve housing 9 seen from above with the connection member 8 on its way to be brought into the catching member 43, which is substantially funnel shaped. Owing to this shape the catching 43 catches the connection member 8 also if it is brought slightly inclined towards the valve housing 9, i.e. the catching member 43 catches the connection member 8 and guides it to the guiding means 44 at said first position.

The above mentioned coupling device 47 comprises a protruding member 48 connected to the connection member 8, which protruding member is provided with a waist, i.e. two indentations 49. It furthermore comprises two coupling members 50 of the sliding valve 31. The coupling members 50 are freely movable relative to the sliding valve 31 across the common movement direction of the same and the connection member 8. The valve housing 9 is provided with a pair of indentations 52 (see also FIG. 4C), which, as well as the indentations of the protruding member 48, are adapted to receive the coupling member 50.

Figure 5B:
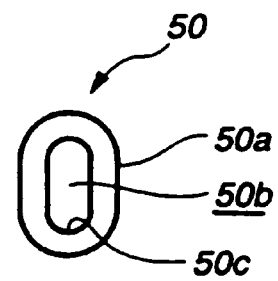
FIG. 5B is an enlarged top plan view of the coupling member of the sliding valve of the present invention.

The movement of the respective coupling member 50 is limited to two directions (see FIG. 5a) of a lower surface 51a, two protrusions 51b forming opposite surfaces and a retaining member 53. The coupling member 50 is substantially elliptically formed (see FIG. 5b) with two parallel sliding surfaces 50a and is provided with a slit 50b with two end surfaces 50c. The sliding surfaces 50a are adapted to slide against the two opposite surfaces of the protrusions 51b.

Figure 5C:
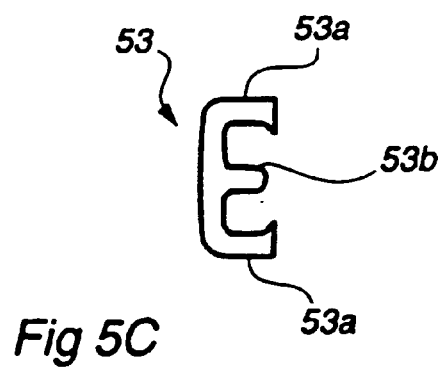
FIG. 5C is an enlarged side elevational view of the retaining member for holding the coupling member of the sliding valve hereof.

The retaining member 53 has a substantially E-formed cross-section (see FIG. 5c), i.e. it is provided with two outer arms 53a and a central arm 53b. The two outer arms 53a constitute means to connect the retaining member 53 to the two protrusions 51b. The central arm 53b is adapted to be placed in the coupling member's 50 slit 50b for limitation of the freedom of movement of the coupling member 50.

For sake of clearness the retaining member 53 is taken away from the upper coupling member 50 in FIGS. 4A–4E, while the retaining member 53 of the lower coupling member 50 is indicated with broken lines. Compare however with FIG. 5a.

The FIGS. 4B–4E show the connection member 8 and the sliding valve 31 in their respective positions according to the FIGS. 3A–3D, but seen from above.

Figure 4B:
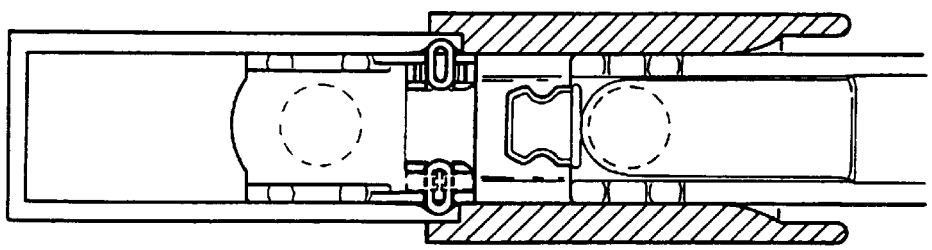
FIG. 4B is an enlarged, fragmentary top plan view similar to FIG. 4A showing the connection of the connection member to the valve housing and coupling to the sliding valve in a second step.

In FIG. 4B the connection member 8 is between the first position and the intermediate position.

Figure 4C:
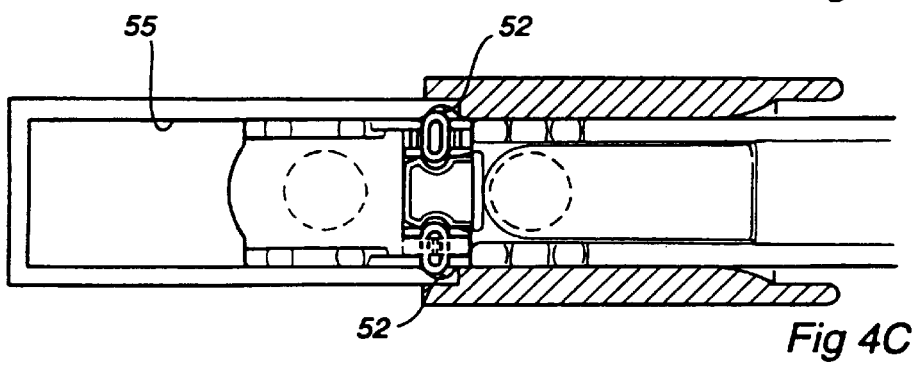
FIG. 4C is an enlarged, fragmentary top plan view similar to FIG. 4A showing the connection of the connection member to the valve housing and coupling to the sliding valve in a third step.

In FIG. 4C the connection member's 8 indentations 49 are right before the coupling member 50 and the movement of the connection member 8 has, by contact between the protruding member 48 and the sliding valve 31, been moved to the latter slightly in the same direction. The transition of the indentations 52 of the valve housing 9 into a wall 55 has then forced the coupling member 50 to move towards each other and partly into the respective indentations 49 of the protruding member 48.

Figure 4D:
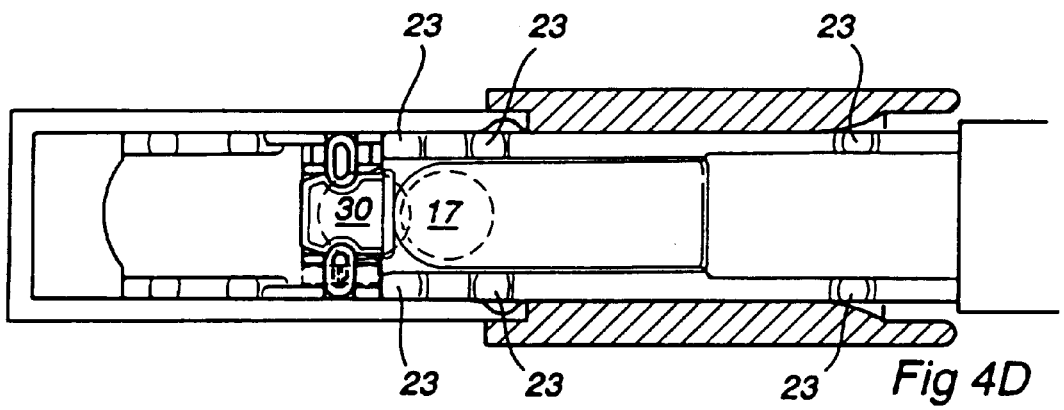
FIG. 4D is an enlarged, fragmentary top plan view similar to FIG. 4A showing the connection of the connection member to the valve housing arid coupling to the sliding valve in a fourth step.

In FIG. 4D the coupling member 50 is no longer freely movable relative to the sliding valve 31, since the wall 55 of the valve housing 9 prevents the movement of the coupling members 50 in a direction away from each other. The coupling members now completely fill up the indentations 49 of the protruding member 48, and the sliding valve 31 is thereby positively connected to the connection member 8. The coupling is of the kind that an end surface 56 of the sliding valve 31 (see FIG. 5a) sealingly abuts against an end surface 57 of the first protruding part 12 of the connection member 8 (see FIG. 2B). The sealing abutment is shown at 58 in FIG. 3C. Hereby is prevented that surrounding air is sucked into the milk line via the opening 30 of the connection piece 29, which otherwise would have occurred if a slit had been left behind between the end surfaces 56 and 57. These end surfaces are accordingly pressed together by the above described form of the coupling device.

Figure 4E:
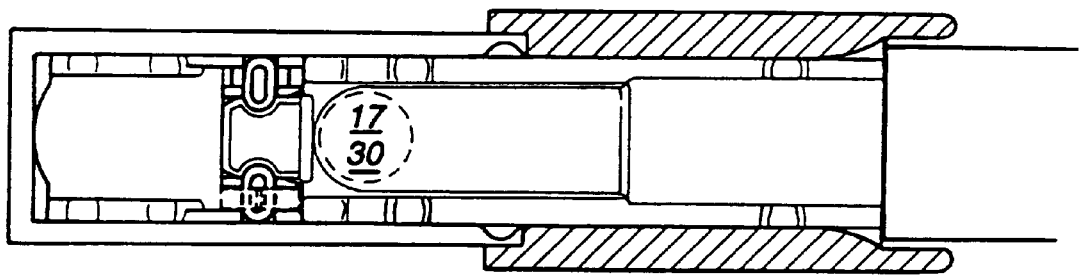
FIG. 4E is an enlarged, fragmentary top plan view similar to FIG. 4A showing the connection of the connection member to the valve housing arid coupling to the sliding valve in a final fifth step.

In conclusion, the opening 17 of the connection member 8 is in FIG. 4E right before the opening 30 of the connection piece 29, such that the first passage 14a of the connection member 8 communicates with the milk line 4.

Figure 6B:
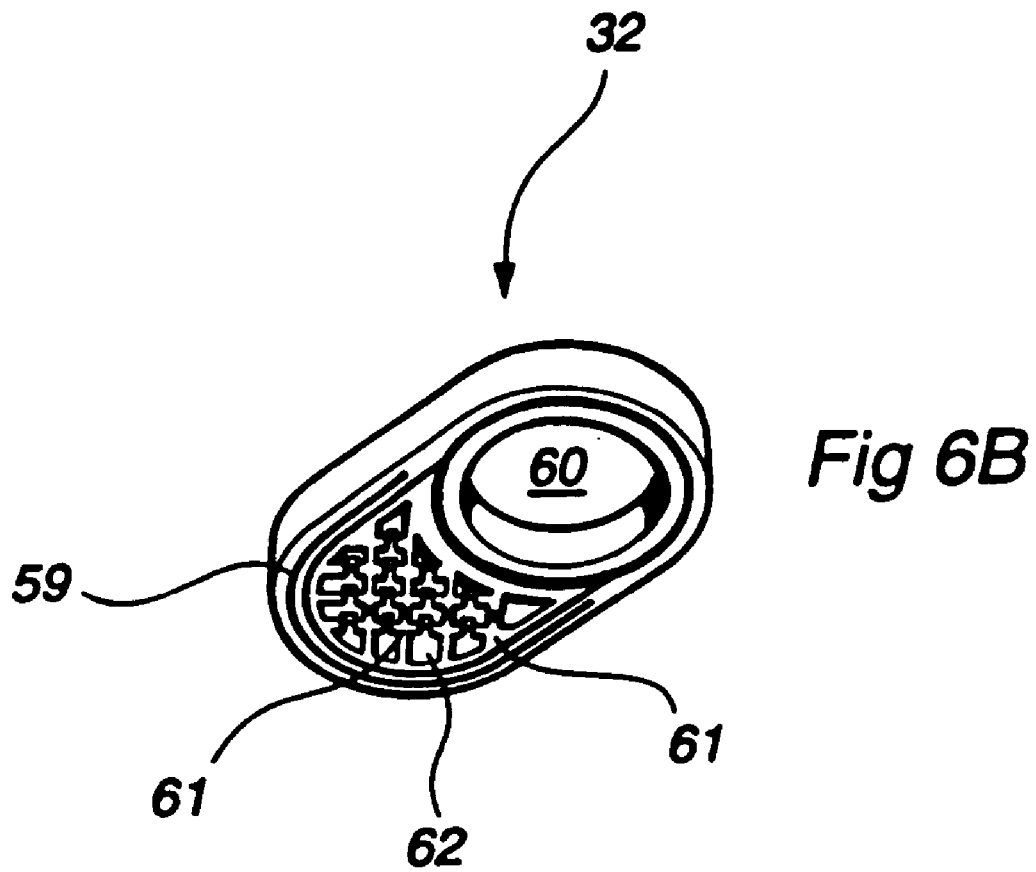
FIG. 6B is an upper rear left perspective view of the sealing valve of the present invention shown in FIG. 6A.
Figure 6A:
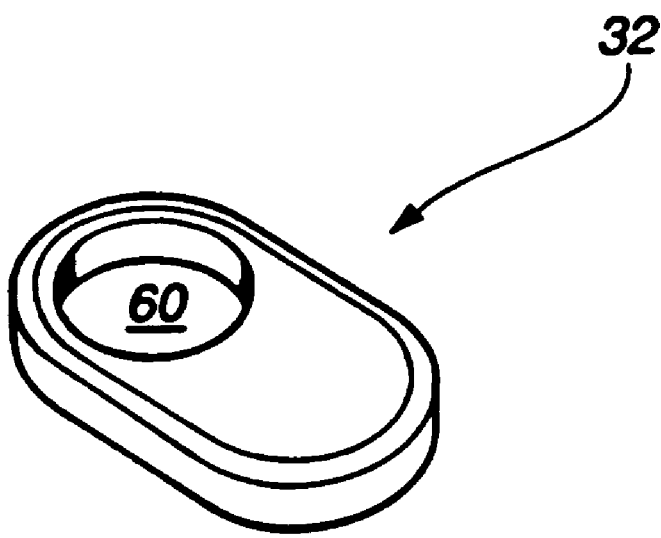
FIG. 6A is a lower right front perspective view of the sealing valve of the present invention.

FIG. 6A shows the side of the valve housing's 9 sealing member 32 that faces the sliding valve 31 in FIG. 3A. The sealing member 32 is made of any suitable elastomeric material, such as rubber. FIG. 6B shows the opposite side of the sealing member 32, which is provided with a groove 59 for the attachment of the sealing member to the valve housing 9, an opening 60 which is adapted to be right before the opening 30 of the first connection piece 29 and a pattern of protrusions 61, forming interspaces 62.

The sealing member 32 could certainly be solid, i.e. without a pattern of protrusions 61, but as will be clear later it is desirable in some situations that central parts of the sealing surface of the sealing member are more resilient than the peripheral parts of the same sealing surface.

FUNCTION

When a cow is to be milked with the equipment shown in FIG. 1, the control unit 5 with attached milking unit 1 and connection member 8 is carried to the cow. Safely arrived the hook 7 of the control unit 5 is hung for example onto the vacuum line 3.

It is now possible in one single movement to connect the connection member 8 to the valve housing 9 such that communication between the vacuum line 3 and the milk line 4 is established; this owing to the design of the above described catching member 43. Simultaneously, the pulsator of the control unit 5 is connected via the connectors 45,46 to a tension source and the ratchet 27 hooks into the edge 28 of the valve housing 9. The milking unit 1 is now ready to be attached to the teats of the cow.

After finished milking of the cow the connection member 8 is gripped with one hand and the push handle 26 is squeezed with the fingers, the ratchet 27 being released from the valve housing 9 and the connection member 8 can be taken away from the valve housing 9 with one single pulling movement.

Hereby is at the beginning the sliding valve 31 positively connected to the connection member 8 by means of the coupling device 47. When the connection member 8 has been pulled to the position shown in FIG. 4C, the sliding valve 31 again covers the opening 30 of the connection piece 29. The continued movement of the sliding valve in the pulling direction is prevented by the stop member 33a, which now abuts the edge 33b of the valve housing 9. By further pulling movement, the coupling member 50 is forced to move out of the indentations 49 of the connection member 8 and into the indentations 52 of the valve housing 9, the connection member 8 being released from the sliding valve 31. The connection member 8 can now be removed from the valve housing 9.

The control unit 5 with attached milking unit 1 and connection member 8 is brought to the next cow to be milked. In the milk tube 21, which connects the control unit 5 to the connection member 8 there is in most cases at this moment a small amount of milk left. During connection of the connection member 8 to the valve housing 9 this amount of milk will in the position as shown in FIGS. 3C and 4D be rapidly slung towards the part of the sealing member 32, which does not comprise the opening 60, since the interior of the milk tube 21 will be affected by vacuum from the milk line 4 already when a small overlap of the opening 17 of the connection member 8 and the opening 30 of the connection piece 29 has been accomplished.

If the sealing member 32 would only be formed to surround the opening 30 of the connection piece 29, i.e. to be substantially circular instead of elliptical, milk would hit surfaces of the valve housing 9, not being covered by the valve member. If the sealing member 32 certainly had an elliptical shape, as shown in FIGS. 6A and 6B, but were solid, i.e. without protrusions 61 and interspaces 62, there would be a risk for leakage of milk when a small amount of milk as has been described above hits the sealing member 32. The small amount of milk namely hits the sealing member with such a velocity that milk risks to leak between the connection member 8 and the sealing member 32 if the kinetic energy of the amount of milk is not taken up in a suitable manner. Owing to the pattern of protrusions 61 forming interspaces 62, such taking up of energy can be performed by impression of the central parts of the sealing member 32 when it is hit by the small amount of milk, while sealing is maintained between the connection member 8 and other parts of the sealing member 32, such that leakage does not occur.

Certainly, the number of coupling members 50 with thereto belonging members that have indentations 49,52 need not be two. It would be enough with one coupling member 50, even if two are preferable for reasons of security of performance.

It is also not necessary that the coupling member has the exact shape as has been described, but also other shapes of the coupling member are possible, such as spring loaded balls.

It is also not necessary that the number of bulges 23,34 of the connection member 8 and the sliding valve 31, respectively, be six and four, respectively, but it would be enough with a smaller number, probably two, in order to secure sealing.

It should be noted that the sliding valve needs not to perform a translational movement as shown for example in FIGS. 4A–4E. Within the frame of the invention the valve could alternatively perform a turning movement about an axis.

The ball valve could certainly be exchanged to any other kind of valve, e.g. a sliding valve.

I claim:

1. A connection device for connection of a milking unit to a milk line in a pipeline milking plant, the milk line having a wall that surrounds a channel and has a hole, and the milking unit having a cavity for extracted milk, comprising:

a valve housing having an opening and being adapted to be fastened to the milk line in such a way that the opening communicates with the channel of the milk line via the hole in the wall of the milk line;

a connection member having a through passage and being adapted to be connected to the milkinig unit in such a way that the passage communicates with said cavity of the milking unit, the connection member further being adapted to be releasably connected to the valve housing in such a way that the passage communicates with the opening of the valve housing;

guiding means adapted during a translational movement of the connection member to positively guide the connection member in relation to the valve housing in a predetermined movement path from a first position to a second position, in which latter position the passage of the connection member communicates with the channel of the milk line via the opening of the valve housing and the hole in the wall of the milk line;

a sliding valve which is adapted to cover said opening of the valve housing in a closing position, and to uncover this opening in an opening position, such that it communicates with the passage of the connection member; and a coupling device adapted, during a positively controlled translational movement of the connection member, when the connection member is in an intermediate position between said first and second positions to connect the connection member to the sliding valve in such a way that the sliding valve is positively connected to the connection member, the coupling device further being adapted to release the connection member from the sliding valve in said intermediate position of the connection member, when the connection member is moved in a direction from said second towards said first position.

2. A connection device according to claim 1, wherein the connection member is shaped such that it seals against the sliding valve at least when the connection member is moved in a direction from said second towards said first position.

3. A connection device according to claim 2, wherein the coupling device comprises at least one coupling member, which in said intermediate position of the connection member is freely movable between a connecting position and a disconnecting position when not actuated, but is adapted, in said connecting position, to be kept substantially immovable relative to the sliding valve and the connection member when the connection member actuates the sliding valve during the movement of the sliding valve between its intermediate position and its said second position.

4. A connection device according to claim 2, including a catching member for guiding the connection member to said first position during movement of the connection member towards the valve housing, such that the connection member gets into engagement with the valve housing by means of said guiding means.

5. A connection device according to claim 2, including a sealing member for sealing the opening of the valve housing against the sliding valve when the sliding valve is in said intermediate position and against the passage of the connection member when the connection member is in said intermediate position and is formed such that it extends in a direction towards said first position at least as far that it seals against the passage when the periphery of the opening is a tangent to the periphery of the passage.

6. A connection device according to claim 1, wherein the coupling device comprises at least one coupling member, which in said intermediate position of the connection member is freely movable between a connecting position and a disconnecting position when not actuated, but is adapted, in said connecting position, to be kept substantially immovable relative to the sliding valve and the connection member, when the connection member actuates the sliding valve during the movement of the sliding valve between its intermediate position and its said second position.

7. A connection device according to claim 6, wherein the valve housing is shaped such that it keeps the coupling member in said connecting position when the connection member is between its intermediate position and said second position.

8. A connection device according to claim 7, wherein the valve housing is placed and mounted such that movement of the connection member in the valve housing is forced to occur substantially in the same direction as the one in which the connection member has been moved up to the catching member.

9. A connection device according to claim 8, including a sealing member for sealing the opening of the valve housing against the sliding valve when the sliding valve is in said intermediate position and against the passage of the connection member when the connection member is in said intermediate position and is formed such that it extends in a direction towards said first position at least as far that it seals against the passage when the periphery of the opening is a tangent to the periphery of the passage.

10. A connection device according to claim 7, including a catching member for guiding the connection member to said first position during movement of the connection member towards the valve housing, such that the connection member gets into engagement with the valve housing by means of said guiding means.

11. A connection device according to claim 7, including a sealing member for sealing the opening of the valve housing against the sliding valve when the sliding valve is in said intermediate position and against the passage of the connection member when the connection member is in said intermediate position and is formed such that it extends in a direction towards said first position at least as far that it seals against the passage when the periphery of the opening is a tangent to the periphery of the passage.

12. A connection device according to claim 3, including a catching member for guiding the connection member to said first position during movement of the connection member towards the valve housing, such that the connection member gets into engagement with the valve housing by means of said guiding means.

13. A connection device according to claim 6, including a sealing member for sealing the opening of the valve housing against the sliding valve when the sliding valve is in said intermediate position and against the passage of the connection member when the connection member is in said intermediate position and is formed such that it extends in a direction towards said first position at least as far that it seals against the passage when the periphery of the opening is a tangent to the periphery of the passage.

14. A connection device according to claim 1, including a catching member for guiding the connection member to said first position during movement of the connection member towards the valve housing, such that the connection member gets into engagement with the valve housing by means of said guiding means.

15. A connection device according to claim 14, wherein the sealing member is, within a predetermined area, provided with a plurality of protrusions forming interspaces for facilitating impression of said predetermined area.

16. A connection device according to claim 14, including a sealing member for sealing the opening of the valve housing against the sliding valve when the sliding valve is in said intermediate position and against the passage of the connection member when the connection member is in said intermediate position and is formed such that it extends in a direction towards said first position at least as far that it seals against the passage when the periphery of the opening is a tangent to the periphery of the passage.

17. A connection device according to claim 1, wherein a sealing member is provided to seal the opening of the valve housing against the sliding valve when the sliding valve is in said intermediate position and against the passage of the connection member when the connection member is in said intermediate position and is formed such that it extends in a direction towards said first position at least as far that it seals against the passage when the periphery of the opening is a tangent to the periphery of the passage.

* * * * *